Jan. 3, 1928. A. J. JACKMAN Re. 16,845

REFRACTORY ARTICLE AND PROCESS OF MAKING THE SAME

Original Filed May 26, 1923 2 Sheets-Sheet 1

INVENTOR

Arthur J. Jackman by his attorneys

Byrnes, Stebbins & Bennett.

Jan. 3, 1928. A. J. JACKMAN Re. 16,845
REFRACTORY ARTICLE AND PROCESS OF MAKING THE SAME
Original Filed May 26, 1923 2 Sheets-Sheet 2
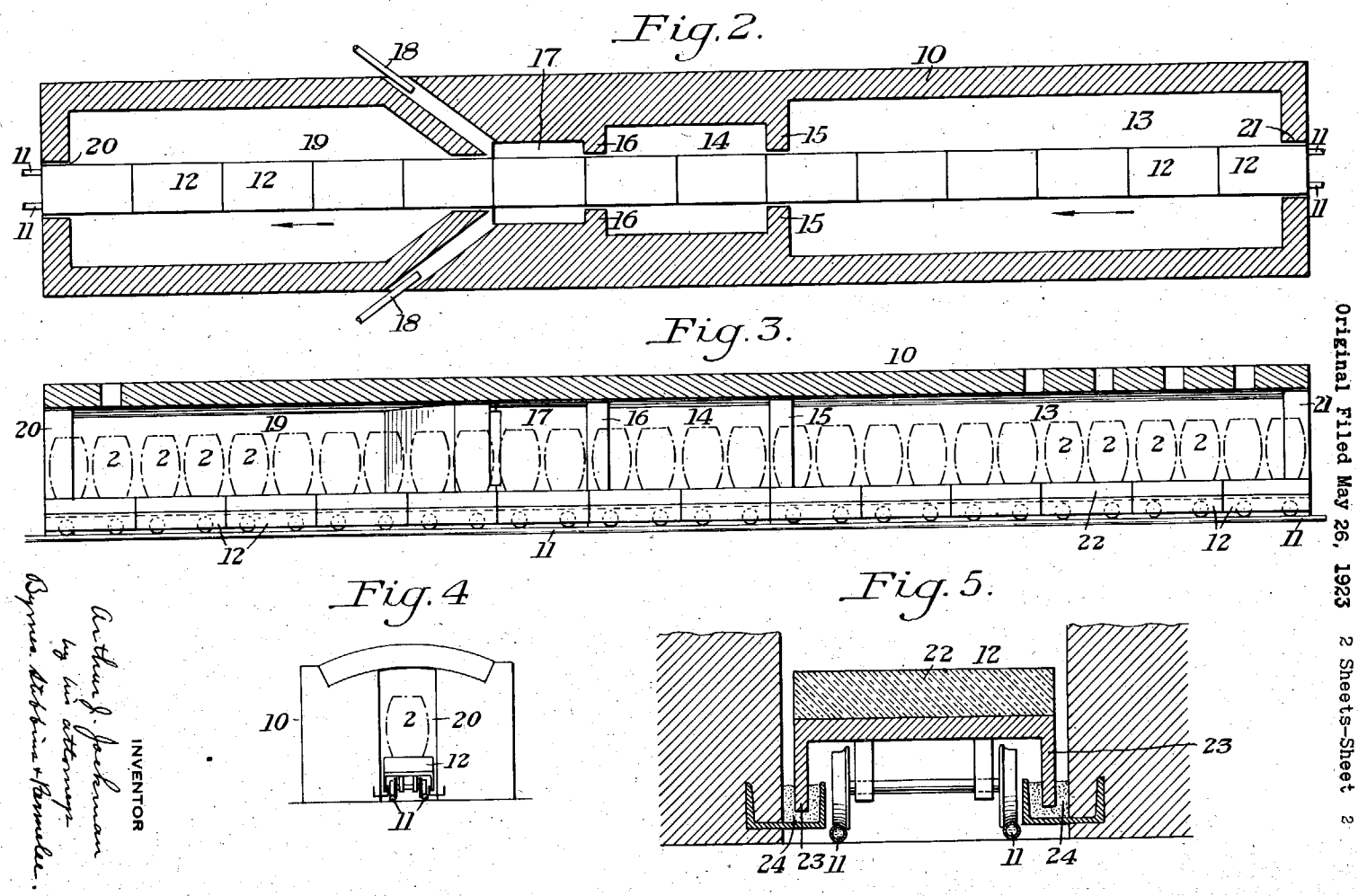
INVENTOR
Arthur J. Jackman
by his attorneys
Byrnes, Stebbins & Parmelee.

Reissued Jan. 3, 1928. Re. 16,845

UNITED STATES PATENT OFFICE.

ARTHUR J. JACKMAN, OF FOREST HILLS BOROUGH, PENNSYLVANIA, ASSIGNOR TO VESUVIUS CRUCIBLE COMPANY, OF SWISSVALE, PENNSYLVANIA, A CORPORATION OF PENNSYLVANIA.

REFRACTORY ARTICLE AND PROCESS OF MAKING THE SAME.

Original application filed May 26, 1923, Serial No. 641,754. Continued and application filed August 2, 1924, Serial No. 729,817. Original No. 1,577,124, dated March 16, 1926. Application for reissue filed November 22, 1927. Serial No. 235,104.

This application is a continuation of my application Serial No. 641,754, filed May 26, 1923.

The present invention relates to refractory articles and more particularly to refractory vessels, such as crucibles, saggers and the like, containing graphite and a ceramic bonding material, and to the process of making them.

In making graphite crucibles, ball clay is usually used as a bond. According to the usual practice now in vogue, after the ware is formed, it is fired in kilns to a temperature lower than the vitrifying point of the clay, such temperature being as a rule considerably less than 2000° F. The clay bond being unvitrified will rehydrate in a moist atmosphere and the crucibles are therefore sensitive and liable to spalling, particularly if they are not carefully reheated or annealed by the user prior to using. Even then such crucibles are liable to spall when used. Moreover, such crucibles are relatively soft when put into use and are, therefore, liable to damage from abrasion and breakage. Such crucibles, particularly when silica sand is used in the mixture, may have formed on them a glaze-like crust in use. Such glaze-like crust, however, is not adherent and spalls off at each heating when the crucible is used.

In making my improved graphite crucibles, I employ a ceramic bond, preferably in the nature of a porcelain, and burn the crucible prior to use to a temperature above the vitrification point of the bonding material. This burning is preferably carried out until there is a substantially complete maturing and vitrification of the bonding material throughout the body of the material. The crucibles so burned will not rehydrate and do not need to be reheated or annealed by the user prior to use. The crucible is also structurally stronger and is less liable to be damaged by breaking in transit before delivery to the user. A glaze is formed on the surface of the crucible which is integral with the vitrified bond and which will not spall. Even if the glaze is knocked off by rough handling, the bonding material being already vitrified readily forms a glaze which is integral with the bonding material and which will not spall off. My crucibles resist abrasion better, conduct heat better and react more slowly to slag erosion than the crucibles as heretofore made which have been burned prior to use to a temperature insufficient to form a vitrified bond.

In the accompanying drawings, which illustrate apparatus for burning the crucibles:

Figures 2, 3 and 4 are a horizontal section, a vertical section and an end elevation, respectively, of a continuous kiln for carrying out the final burning of the crucibles; and Figure 5 is a detail section through a portion of such continuous kiln.

Figure 1:
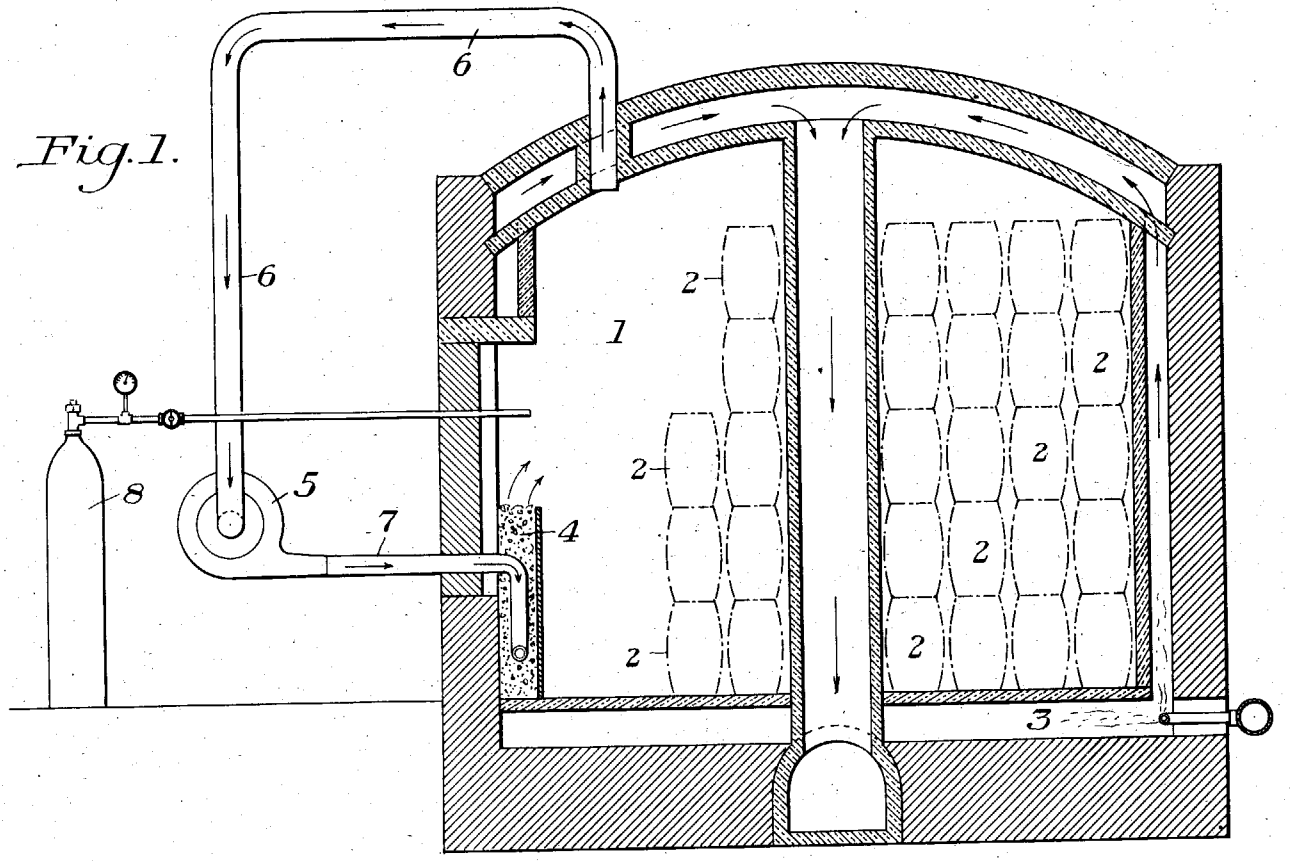
Figure 1 is a sectional view of the kiln for giving the crucibles the first burn.

I will now describe in detail the preferred process of making my improved crucibles, it being understood that the invention is not limited to such preferred procedure.

I take graphite and a ceramic bonding material and mix them together with water in the usual manner and mold the mix into crucibles in the usual manner. Graphite may be used alone as the non-fusing inert constituent or some other non-fusing inert material may be mixed with it, such as silicon carbide, tridymite, zirconium silicate or alumina. The ceramic bonding material is preferably of a porcelain nature in which the several constituents of the bonding material mature or chemically combine into a vitrified bond during the burning of the crucibles.

As a typical example of suitable mix, I take graphite, either crystalline or flake, 45 parts, settling tank silicon carbide fines 15 parts and a porcelain bonding mixture 40 parts. Settling tank silicon carbide fines is the fine material which settles in the tanks after grinding and washing silicon carbide grains in the manufacture of silicon carbide abrasives. Such fines, except for an occasional larger grain, consist of silicon carbide in powdered form. In order to give the article the proper hardness and density, the bonding material is preferably over 25% by weight of the total mass.

The bonding material is a porcelain mixture and consists of ball clay, kaolin and a flux. Typical mixes of bonding material are ball clay 25 parts, kaolin 5 parts and Cornwall stone 10 parts; or ball clay 30 parts, kaolin 7 parts and raw magnesite 3 parts. The above proportions may, of course, be varied to meet the particular uses to which the crucibles are put, and various other fluxing ingredients may be employed, such as raw dolomite, lime stone, whiting, cryolite, feldspar, borax, or any other of the usual pottery-fluxes. The mixture should contain a sufficient amount of the porcelain forming ingredients, such as porcelain clays and fluxes, so that the vitrified bond formed will be of a porcelain nature.

After the crucibles are molded, they are thoroughly air-dried and then placed in a kiln and burned in a non-oxidizing, preferably reducing, atmosphere to approximately 1200° F. In Figure 1 of the drawings is illustrated a suitable kiln for this purpose. This kiln is of the usual sort, having a muffle chamber 1 in which the crucibles 2 are stacked, heated by combustion in the passages 3.

I preferably maintain a reducing atmosphere in this kiln. For this purpose I provide a bed of coke 4 and a fan 5 for withdrawing the gases from the kiln through the pipe 6 from the kiln and blowing it through the pipe 7 through the bed of coke 4 which is heated to incandescence and which maintains a reducing atmosphere in all parts of the kiln, even if the kiln be not absolutely air tight. After the ware is charged into the kiln, I prefer to initially fill the kiln with carbon dioxide which may be conveniently introduced from a tank 8 of liquefied carbon dioxide. After the carbon dioxide has expelled the air, the tank 8 is shut off and the atmosphere in the kiln is maintained in a reducing condition by the circulation through the bed of coke 4.

This burning operation, which may extend over a period of several days, thoroughly dehydrates the bonding material and in case the bonding material contains carbonates, it converts the carbonates to the oxide form throughout the mass. The dehydration and reduction of carbonates, if present, renders the material receptive to the chemical combinations which take place at the higher temperatures of the final burning operation.

The reducing atmosphere in the kiln prevents the oxidation of the graphite, so that the crucibles come from the first burning operation with the graphite in an unreduced condition. If the crucibles were exposed to an oxidizing atmosphere during this prolonged burning operation, the graphite would be oxidized below the surface of the crucibles and surface cracking would result upon subsequent firing to a glazing temperature.

This first burning operation, which is carried out to the temperature usually heretofore employed in burning graphite crucibles, does not vitrify the bond or form any glaze on the crucibles. The crucibles, if allowed to stand in the atmosphere after this first burning, would rehydrate and if used in this condition would be liable to spall.

After the crucibles are burned as above described, they are further burned in an oxidizing atmosphere for a short time to a temperature of about 1250° F. The length of time which the crucibles are given the oxidizing burn at this temperature depends upon the size of the crucibles, but should not generally exceed about two hours. A crucible of 15 by 12 in. dimension usually requires about one half hour for the oxidizing burn. This serves to oxidize the graphite at the surface only. The oxidation should be only skin deep, preferably not over about a thirty second of an inch and usually about a hundredth of an inch. The depth of oxidation determines the thickness of the glaze. If the oxidation be too deep, it will cause crazing or cracking and spalling of the surface. The removal of the graphite from the surface renders the surface more fusible, so that the surface glaze is formed when the heat is afterward raised. The ash from the burned graphite also combines with the bonding material to somewhat lower its melting point at the surfaces and form the glaze. After the crucible is subjected to such surface oxidation, it is immediately heated to a temperature of over 2000° F., preferably at from 2200° to 2800° F., depending upon the mix and the service to which the crucible is to be put. The length of this high temperature burn also depends upon the size of the crucibles, but should not generally exceed about a quarter of an hour. This final burning is preferably carried out in a non-oxidizing and preferably reducing atmosphere, so that the surface oxidation is checked. The temperature to which the final burning is carried is well above the vitrification point of the bonding material and sufficient to mature the porcelain, i. e., to cause the ingredients of the porcelain bonding material mix to combine chemically into a homogeneous bond throughout the body of the crucible. The bonding material is now no longer susceptible to rehydration and the crucibles may be put into use without danger of spalling or the necessity of careful reheating or annealing heretofore necessary with graphite crucibles as usually made. The thus matured and vitrified bond forms a strong body which can better resist mechanical shock and abrasion in use. By the term "to vitrify," I mean to develop by heat such a degree of compactness of structure by solution between the constituents of the bond that the mass as a whole has the characteristics above pointed out, and is hard, strong and substantially impervious to moisture under normal conditions of use. Tests have shown that the hardness of my crucible material is such that a 10 millimeter hard steel ball under a load of 175 kilograms makes an indentation not over 4½ millimeters in diameter, and its strength, as determined by breaking a bar approximately one inch square in cross-section and a four inch span, shows a modulus of rupture of over 1500 pounds per square inch. Experience has demonstrated that such hardness and strength in materials of this class can be developed only by vitrifying the bond under proper conditions as herein described. The adherent glaze formed on the surface of the crucible by the fluxing of the surface bonding material from which the graphite was burned during the oxidizing heat is formed from the body of the bonding material and is integrally united therewith, there being no line of demarcation between the glaze and the bonding material in the body of the crucible. This glaze is entirely different from the surface crust-like glaze formed on the crucibles in service by the exudation of silica, which crust-like glaze readily spalls off of the crucibles. The glaze which is formed on my crucibles is adherent and will not spall off like the crust-like glazes formed on crucibles in the metal melting furnaces or like the glazes applied by dipping or painting. The glaze gives the crucible a hard attractive looking surface substantially free from crazing or cracks and which resists wear and abrasion. In case the glaze becomes chipped off in use, the exposed vitrified bond beneath it immediately forms a glaze when exposed to the heat of the furnace in which the crucibles are used. Such replacement glaze being formed from the vitrified bonding material is likewise adherent.

Continued use of the crucibles made in accordance with my process has shown a greatly increased life over crucibles made by the usual processes now in vogue.

In Figures 2 to 5 of the drawings, I have shown a continuous furnace for carrying out the final burning of the crucibles. This furnace is of the tunnel kiln type, consisting of an elongated tunnel 10 of brick work having tracks 11 along which travel cars 12 bearing the crucibles 2. The crucibles travel through the furnace from right to left, as indicated by the arrows on the drawings. The crucibles first pass into an oxidizing chamber 13 in which they are given the oxidizing heat to oxidize their surface. They then pass from oxidizing chamber into a chamber 14 in which is maintained a non-oxidizing atmosphere and in which the crucibles are brought up to a temperature above the vitrification point of the bonding material. The non-oxidizing atmosphere checks the oxidation of the graphite and serves to protect the graphite in the body of the crucible from further oxidation during the final or high temperature firing of the crucible. The chamber 14 is separated from the chamber 13 by baffles 15 which serve to confine the gases of combustion and prevent entry of the oxidizing atmosphere into the chamber 14. The chamber 14 is also separated by baffles 16 from another chamber 17 into which are discharged the gases of combustion from the burners 18 and in which the crucibles are given their final and highest heat. The air for the burners 18 is restricted so that a reducing atmosphere is maintained in the chamber 17. As the gases of combustion pass by the baffles 16 in the chamber 14 some secondary combustion takes place, although the atmosphere in the chamber 14 is maintained in a reducing or neutral condition. As the gases of combustion pass the baffles 15, further secondary combustion takes place, sufficient air being admitted to the chamber 13 to produce an oxidizing atmosphere therein. The crucibles pass from the chamber 17 into an annealing chamber 19 from which they are finally discharged through the outlet door opening 20. Suitable closures, not shown, may be provided for the outlet opening 20 as well as the inlet opening 21.

As shown in the drawings, the crucibles are carried through the kiln on cars 12. These cars have refractory tops or platforms 22 and depending flanges 23 which fit into sand seals 24 to protect the running gear of the cars from the heat of the kiln. The tracks 11 are preferably water cooled, as indicated in Figure 5. After a car has traveled through the kiln, it is brought around from the outlet to the inlet and reloaded, and travels again through the kiln, as is the usual practice in operating a tunnel kiln.

On account of the relatively longer time of the dehydration firing of the crucibles, I prefer to carry out the first burning operation in a separate kiln 1, as indicated in the drawings. However, if desired, the entire burning process may be carried out in a continuous or tunnel type kiln in which case the first chamber of such kiln would correspond in its action to the dehydration burning carried out in the kiln indicated in Figure 1 of the drawings.

While I have described the preferred composition used in making my crucibles together with the preferred process and kilns for carrying out such process, it is to be understood that the invention is not limited to the specific details of its preferred embodiment but may be otherwise embodied within the scope of the following claims:

I claim:

1. As a new article of manufacture, a refractory article consisting principally of graphite and a vitrifiable ceramic bond, and burned prior to use to a temperature above the vitrification point of the bonding material.

2. As a new article of manufacture, a refractory article consisting principally of graphite and a vitrifiable ceramic bond, and burned prior to use to a temperature above 2000° F.

3. As a new article of manufacture, a refractory article consisting principally of graphite and a vitrifiable ceramic bond, and burned prior to use to a temperature between 2000° and 2800° F.

4. As a new article of manufacture, a refractory article consisting principally of graphite and a vitrifiable ceramic bond, and burned prior to use to a temperature sufficient to substantially completely vitrify the bonding material throughout the body of the article to produce a structure which is hard, strong and substantially impervious to moisture.

5. As a new article of manufacture, a refractory article consisting principally of graphite and a porcelain bonding material, and burned prior to use to a temperature above the vitrification point of the porcelain bonding material.

6. As a new article of manufacture, a refractory article consisting principally of graphite and a porcelain bonding material, and burned prior to use to a temperature above 2000° F.

7. As a new article of manufacture, a refractory article consisting principally of graphite and a vitrifiable ceramic bond, and burned prior to use to a temperature above the vitrification point of the bonding material and having an adherent glaze formed integral with the bond.

8. As a new article of manufacture, a refractory article consisting principally of graphite and a porcelain bonding material and burned prior to use to a temperature sufficient to substantially completely vitrify the bonding material throughout the body of the article, and to form on the surface thereof an adherent glaze integral with the vitrified bond.

9. As a new article of manufacture, a refractory article consisting principally of graphite and clay, and containing a fluxing ingredient, and burned prior to use to a temperature above fusion point of the fluxing ingredient into a body which is hard, strong and substantially impervious to moisture.

10. As a new article of manufacture, a refractory article consisting principally of graphite and a vitrifiable ceramic bond containing clay and a fluxing ingredient, the bonding material being in the neighborhood of 40% by weight of the total mass, and burned prior to use to a temperature above the fusion point of the fluxing ingredient into a body which is hard, strong and substantially impervious to moisture.

11. As a new article of manufacture, a refractory article consisting principally of graphite and a vitrifiable ceramic bond containing clay and a fluxing ingredient, the bonding material being over 25% by weight of the total mass, and burned prior to use to a temperature above the fusion point of the fluxing ingredient into a body which is hard, strong and substantially impervious to moisture.

12. As a new article of manufacture, a refractory article consisting principally of graphite and a vitrifiable ceramic bond, and burned prior to use to a temperature above the vitrification point of the bonding material, the proportion of the ingredients and the temperature being such as to form a body having a structure which is hard, strong and substantially impervious to moisture.

13. The process of making refractory articles, which comprises molding them from a mix consisting principally of graphite and clay and containing a fluxing ingredient, and buring the molded article prior to use to a temperature above the fusion point of the fluxing ingredient into a body which is hard, strong and substantially impervious to moisture.

14. The process of making refractory articles, which comprises molding them from a mix containing graphite and a ceramic bonding material, burning the articles to substantially completely dehydrate the bonding material, then oxidizing the graphite at the surface of the article, and thereafter burning the articles to a temperature above the vitrification point of the bonding material.

15. The process of making refractory articles, which comprises molding them from a mix containing graphite and a ceramic bonding material, burning the articles in a non-oxidizing atmosphere, then burning the articles in an oxiding atmosphere, and thereafter burning the articles at a temperature above the vitrification point of the bonding material.

16. The process of making refractory articles, which comprises molding them from a mix containing graphite and a ceramic bonding material, burning the articles in a non-oxidizing atmosphere, then burning the articles in an oxidizing atmosphere, and thereafter burning the articles in a non-oxidizing atmosphere to a temperature above the vitrification point of the bonding material.

17. The process of making refractory articles, which comprises molding them from a mix containing graphite and a porcelain bonding material, burning the articles in a non-oxidizing atmosphere to dehydrate the bonding material, burning the articles in an oxidizing atmosphere to oxidize the graphite at their surfaces, and thereafter burning the articles in a non-oxidizing atmosphere to a temperature sufficient to vitrify and mature the porcelain bonding material throughout the body of the articles and form on their surfaces a glaze integral with the vitrified bond in the body.

18. The process of making refractory articles, which comprises molding them from a mix containing graphite and a ceramic bonding material, burning the articles in a non-oxidizing atmosphere for a sufficient time to dehydrate the bonding material, and then burning the articles so as to oxidize the graphite in the surface skin of the article and fuse the thus oxidized surface skin into a glaze.

19. The process of making refractory articles, which comprises molding the articles from a mix containing graphite and a porcelain bonding material, burning the articles in a non-oxidizing atmosphere for a sufficient time to thoroughly dehydrate the bonding material, burning the articles for a relatively short time in an oxidizing atmosphere to oxidize the graphite in the surface skin only of the articles, and thereafter burning the articles in a non-oxidizing atmosphere to a temperature above 2000° F. so as to vitrify and mature the porcelain bonding material throughout the body of the articles and fuse the oxidized surface skin into a glaze.

20. The process of making refractory articles, which comprises molding them from a mix containing graphite and a ceramic bonding material, burning the articles in a non-oxidizing atmosphere, then burning the articles in an oxidizing atmosphere so as to oxidize the graphite at their surface, and thereafter burning the articles to a temperature above 2000° F.

21. The process of making refractory articles, which comprises molding them from a mix consisting principally of graphite and a vitrifiable ceramic bonding material, and burning the molded articles prior to use to a temperature above the vitrification point of the bonding material.

22. The process of making refractory articles, which comprises molding them from a mix consisting principally of graphite and a vitrifiable ceramic bonding material, and burning the molded articles prior to use to a temperature above 2000° F.

23. The process of making refractory articles, which comprises molding them from a mix consisting principally of graphite and a vitrifiable ceramic bonding material, and burning the molded articles prior to use to a temperature sufficient to substantially vitrify the bonded material throughout the body of the article, the proportions of the ingredients and the burning temperature being such as to form a body having a structure which is hard, strong and substantially impervious to moisture.

24. The process of making refractory articles, which comprises molding them from a mix consisting principally of graphite and a porcelain bonding material, and burning the articles prior to use to a temperature sufficient to vitrify the porcelain bonding material and form it into a glaze at the surface of the article.

25. The process of making refractory articles, which comprises molding them from a mix containing graphite and a vitrifiable ceramic bonding material, burning the articles to substantially completely dehydrate but not fuse the bonding material, and thereafter burning the articles to a temperature above the vitrification point of the bonding material.

26. The process of making refractory articles, which comprises molding them from a mix consisting principally of graphite and a vitrifiable ceramic bond containing clay and a fluxing ingredient, burning the articles at a temperature below the fusion point of the fluxing ingredient but sufficiently high to substantially completely dehydrate the bonding material, and thereafter burning the articles to a temperature above the fusion point of the fluxing ingredient.

In testimony whereof I have hereunto set my hand.

ARTHUR J. JACKMAN.